US012748569B2

(12) United States Patent
Jung et al.

(10) Patent No.: US 12,748,569 B2
(45) Date of Patent: Sep. 29, 2026

(54) APPARATUS AND METHOD WITH NEURAL NETWORK OPERATION

(71) Applicants: SAMSUNG ELECTRONICS CO., LTD., Suwon-si (KR); Seoul National University R&DB Foundation, Seoul (KR)

(72) Inventors: Hanwoong Jung, Seoul (KR); Soonhoi Ha, Seoul (KR); Donghyun Kang, Seoul (KR); Duseok Kang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1086 days.

(21) Appl. No.: 17/863,963

(22) Filed: Jul. 13, 2022

(65) Prior Publication Data

US 2023/0143371 A1 May 11, 2023

(30) Foreign Application Priority Data

Nov. 11, 2021 (KR) ........................ 10-2021-0155090

(51) Int. Cl.
*G06F 7/57* (2006.01)
*G06N 3/045* (2023.01)
(Continued)

(52) U.S. Cl.
CPC ............... *G06F 7/57* (2013.01); *G06N 3/048* (2023.01); *G06N 3/0495* (2023.01); *G06N 3/045* (2023.01)

(58) Field of Classification Search
CPC .......... G06F 7/57; G06F 7/5443; G06F 3/048; G06N 3/063; G06N 3/0495; G06N 3/045
See application file for complete search history.

(56) References Cited

U.S. PATENT DOCUMENTS

| | | | |
|---|---|---|---|
| 2018/0267898 | A1 | 9/2018 | Henry et al. |
| 2020/0234099 | A1 | 7/2020 | Wang et al. |
| 2021/0096823 | A1 | 4/2021 | Li et al. |

FOREIGN PATENT DOCUMENTS

| | | | |
|---|---|---|---|
| KR | 10-2020-0122256 | A | 10/2020 |
| KR | 10-2021-0083624 | A | 7/2021 |

OTHER PUBLICATIONS

Hu, Jie, et al. "Squeeze-and-excitation networks." *Proceedings of the IEEE conference on computer vision and pattern recognition*. arXiv vol. 4. 2019. pp 1-13.

(Continued)

*Primary Examiner* — Emily E Larocque
*Assistant Examiner* — Jerome Anthony Klosterman, II
(74) *Attorney, Agent, or Firm* — NSIP Law

(57) ABSTRACT

A neural network operation apparatus and method are provided. The neural network operation apparatus includes an internal storage configured to store data to perform a neural network operation, an arithmetic logical unit (ALU) configured to perform an operation between the stored data and main data based on an operation control signal, an adder configured to add an output of the ALU and an output of a first multiplexer, wherein the first multiplexer is configured to output one of an output of the adder and the output of the ALU based on a reset signal, a second multiplexer configured to output one of the main data and a quantization result of the stored data based on a phase signal, and a controller configured to control the ALU, the first multiplexer, and the second multiplexer based on the operation control signal, the reset signal, and the phase signal.

19 Claims, 9 Drawing Sheets

(51) Int. Cl.
*G06N 3/048* (2023.01)
*G06N 3/0495* (2023.01)

(56) References Cited

OTHER PUBLICATIONS

Korean Office Action issued on Nov. 29, 2024 in corresponding Korean Patent Application No. 10-2021-0155090. (2 pages in English and 5 pages in Korean).

APPARATUS AND METHOD WITH NEURAL NETWORK OPERATION

CROSS-REFERENCE TO RELATED APPLICATIONS

This application claims the benefit under 35 USC § 119(a) of Korean Patent Application No. 10-2021-0155090, filed on Nov. 11, 2021, in the Korean Intellectual Property Office, the entire disclosure of which is incorporated herein by reference for all purposes.

BACKGROUND

1. Field

The following description relates to an apparatus and method with neural network operation.

2. Description of Related Art

A neural network operation includes various operations corresponding to various layers. For example, the neural network operation may include a convolution operation and a non-convolution operation.

The non-convolution operation may include a reduction operation, and global pooling, which is a reduction operation that is used to compress information of an input feature map having a significantly large spatial dimension such as a squeeze-and-excitation network.

To process information of an input feature map having a large spatial dimension, an operation should be performed by reading all values of two-dimensional feature maps corresponding to a channel per one output pixel.

The reduction operation is not supported by typical accelerators, or may benefit from a separate core. However, the implementation of a separate core may cause a large load compared to the amount of computation and thus, is inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a neural network operation apparatus includes an internal storage configured to store data to perform a neural network operation; an arithmetic logical unit (ALU) configured to perform an operation between the stored data and main data based on an operation control signal; an adder configured to add an output of the ALU and an output of a first multiplexer, wherein the first multiplexer is configured to output one of an output of the adder and the output of the ALU based on a reset signal; a second multiplexer configured to output one of the main data and a quantization result of the stored data based on a phase signal; and a controller configured to control the ALU, the first multiplexer, and the second multiplexer based on the operation control signal, the reset signal, and the phase signal.

The apparatus may include a first register configured to receive the data from the internal storage and store the received data; a second register configured to receive and store the main data; a third register configured to store the output of the ALU; and a fourth register configured to store the output of the first multiplexer.

The apparatus may include a quantizer configured to generate the quantization result by quantizing the stored data based on a quantization factor.

The internal storage may be further configured to store the data based on a channel index that indicates a position of an output tensor of the data.

The ALU may be further configured to perform one of an addition operation and an exponential operation on the stored data and the main data based on the operation control signal.

The phase signal may include a first phase signal to prevent the neural network operation apparatus from performing an operation; a second phase signal to output the main data and update the internal storage; and a third phase signal to output the quantization result.

The apparatus may include an adder tree configured to perform an addition of the output of the ALU.

The ALU may be further configured to generate an exponential operation result by performing an exponential operation, and the adder tree is further configured to perform a softmax operation by adding the exponential operation result.

The quantizer may be further configured to quantize an output of an adder tree which is configured to perform an addition of the output of the ALU.

In a general aspect, a processor-implemented neural network operation method includes storing data to perform a neural network operation; generating an operation control signal to determine a type of operation between the stored data and main data, a reset signal to select one of an output of an adder and an output of an arithmetic logical unit (ALU), and a phase signal to select one of the main data and a quantization result of the stored data; generating an operation result by performing an operation between the stored data and the main data based on the operation control signal; generating an addition result by performing an addition between the operation result and a result selected from a result of the output of the adder and a result of the output of the ALU; selecting one of the operation result and a result of the addition, and outputting the selected one based on the reset signal; and outputting one of the main data and the quantization result of the stored data based on the phase signal.

The method may include receiving the stored data from an internal storage and storing the received data; receiving and storing the main data; storing the output of the ALU; and storing a result selected from the result of the addition and the operation result.

The outputting of one of the main data and the quantization result of the stored data based on the phase signal may include generating the quantization result by quantizing the stored data based on a quantization factor.

The storing of the data may include storing the data based on a channel index that indicates a position of an output tensor of the data.

The generating of the operation result may include performing one of an addition operation and an exponential operation on the stored data and the main data based on the operation control signal.

The phase signal may include a first phase signal to prevent a neural network operation from being performed; a second phase signal to output the main data and update an internal storage configured to store the data; and a third phase signal to output the quantization result.

The method may include performing an addition of the output of the ALU.

The generating of the operation result may include generating an exponential operation result by performing an exponential operation, and the performing of the addition of the output of the ALU may include performing a softmax operation by adding the exponential operation result.

The generating of the quantization result may include quantizing an output of an adder tree configured to perform an addition of the output of the ALU.

Other features and aspects will be apparent from the following detailed description, the drawings, and the claims.

Figure 1:
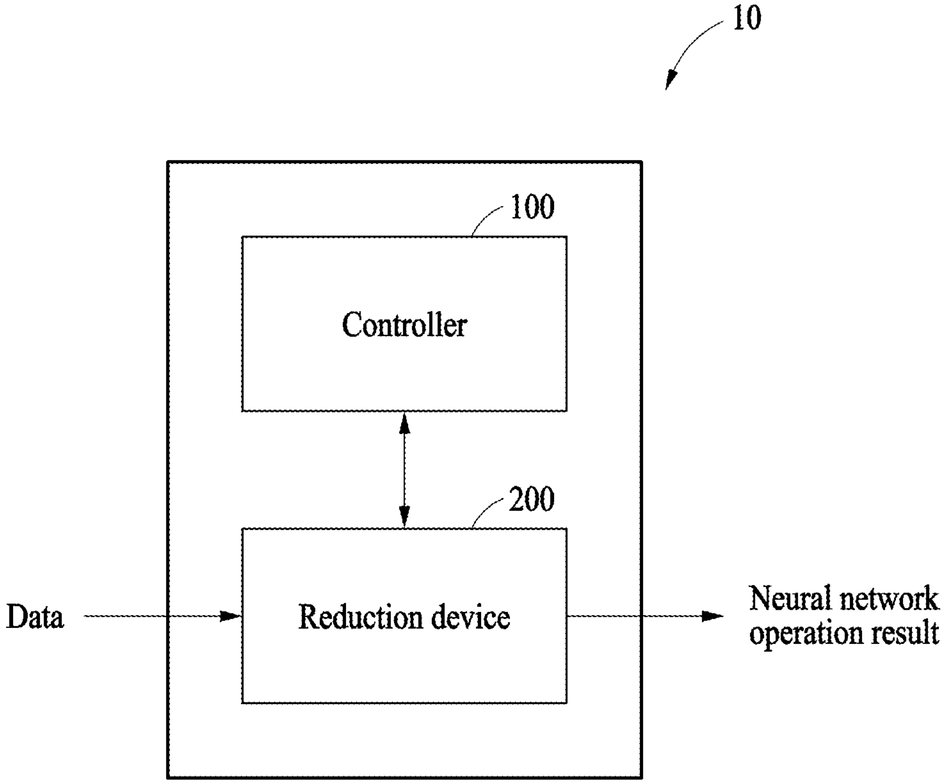
FIG. 1 illustrates an example neural network operation apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example neural network operation apparatus, in accordance with one or more embodiments.

Referring to FIG. 1, a neural network operation apparatus 10 may perform a neural network operation. The neural network operation apparatus 10 may generate a neural network operation result by receiving data, and processing the received data by implementing a neural network.

In an example, the neural network operation apparatus 10 may be added to a neural processing unit (NPU) system using an adder tree in a pipeline form. The neural network operation apparatus 10 may sequentially receive outputs of a main datapath and efficiently perform a reduction operation thereon.

The neural network operation apparatus 10 may generate a control signal to perform a reduction operation by separating the operation into two branches. The control signal may include an operation control signal, a reset signal, and a phase signal. The neural network operation apparatus 10 may store an input value in an internal storage by generating a reset signal to reduce overhead that is consumed to initialize the internal storage to store a reduction operation result.

The neural network may be a general model that has the ability to solve a problem, where nodes (or neurons) forming the network through synaptic combinations change a connection strength of synapses through training. Briefly, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

A node of the neural network may include a combination of weights or biases. The neural network may include one or more layers, each including one or more nodes (or neurons). The neural network may infer a result from a predetermined input by changing the weights of the nodes through training or learning. For example, the weight and biases of a layer structure or between layers or neurons may be collectively referred to as connectivity of a neural network. Accordingly, the training of a neural network may denote establishing and training connectivity. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network may include, as a non-limiting example, a deep neural network (DNN). In an example, the DNN may be one or more of a fully connected network, a convolution neural network, a recurrent neural network, an attention network, a self-attention network, and the like, or may include different or overlapping neural network portions respectively with such full, convolutional, or recurrent connections, according to an algorithm used to process information. The neural network may be configured to perform, as non-limiting examples, computer vision, machine translation, object classification, object recognition, speech recognition, pattern recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples.

The neural network may include a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder eyAE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may be implemented in, as non-limiting examples, a personal computer (PC), a data server, or a portable device.

The portable device may be implemented, as non-limiting examples, a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

The neural network operation apparatus 10 may include a controller 100 and a reduction device 200. The controller 100 may control the reduction device 200 by generating a control signal to control the reduction device 200. The controller 100 may generate, among others, an operation control signal, a reset signal, and a phase signal.

The controller 100 may include one or more processors. The one or more processors may process data stored in a memory. The one or more processors may execute computer-readable code (e.g., software) stored in the memory and instructions triggered by the processor.

The "processor" may be a data processing device implemented by hardware including a circuit having a physical structure to perform desired operations. For example, the desired operations may include code or instructions included in a program.

In an example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The reduction device 200 may generate a neural network operation result by performing a neural network operation by processing data. The reduction device 200 may perform a reduction operation. The reduction operation may include a pooling operation or a softmax operation. For example, the pooling operation may include a global pooling operation.

The neural network operation apparatus 10 may efficiently perform a reduction operation while reducing overhead in an operation by performing the reduction operation using the reduction device 200. The neural network operation apparatus 10 may internally update a global pooling result in the reduction device 200 by inputting an output value of a main datapath to the reduction device 200, and may simultaneously perform two layers by bypassing main data received from the main datapath.

Figure 2:
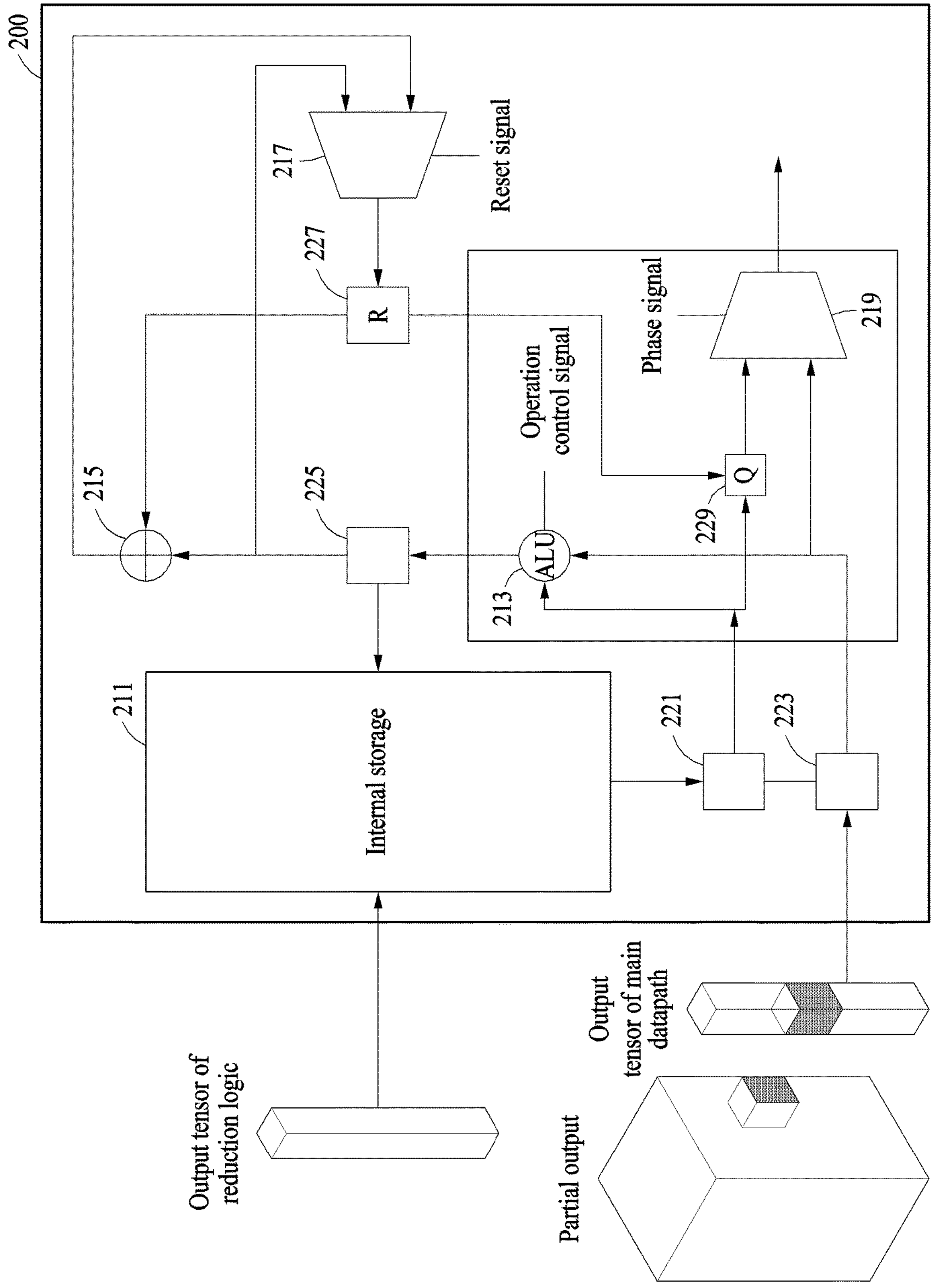
FIG. 2 illustrates an example reduction device illustrated in FIG. 1.

FIG. 2 illustrates an example of a reduction device 200 illustrated in FIG. 1.

Referring to FIG. 2, the reduction device 200 may perform a reduction operation. The reduction operation may benefit from one simple operation per element of an input tensor and may have a relatively small size of an output tensor. Each time an output is generated as an operation in a previous layer is performed, the reduction device 200 may update a result value of a subsequent reduction operation corresponding to an output value through an internal storage 211.

The reduction device 200 may operate differently according to phases. The reduction device 200 may operate differently according to an update phase (e.g., a second phase)

for receiving an output of a previous layer while the previous layer is processed, updating an output tensor value of a reduction operation, and storing it again in the internal storage 211, and a write phase (e.g., a third phase) for transmitting the value stored in the internal storage 211 to an outside after all updates are completed (e.g., after the previous layer is processed).

The reduction device 200 may be positioned in a portion after the calculation of the main datapath (e.g., a portion after a final output is generated). An output of the main datapath may include channel direction data.

When a reduction operation is present after an operation such as convolution that is processible in the main datapath, the reduction device 200 may operate by receiving a partial output of the main datapath.

The reduction device 200 may include the internal storage 211, an arithmetic logic unit (ALU) 213, an adder 215, a first multiplexer 217, and a second multiplexer 219. The reduction device 200 may further include a first register 221, a second register 223, a third register 225, a fourth register 227, and a quantizer 229.

The internal storage 211 may store data to perform a neural network operation. The internal storage 211 may store data based on a channel index indicating a position of an output tensor of the data.

The channel index may include input data that is used to perform a reduction operation and information on a position of an output tensor corresponding to the input data. A controller (e.g., the controller 100 of FIG. 1) may store data in the internal storage 211 based on the channel index.

The ALU 213 may perform an operation between the stored data and main data based on an operation control signal. The ALU 213 may perform an addition operation or an exponential operation between the data stored in the internal storage 211 and main data based on the operation control signal. The ALU 213 may generate an exponential operation result by performing an exponential operation.

The adder 215 may add an output of the ALU 213 and an output of the first multiplexer 217. The data may refer to data stored in the internal storage 211 and used internally by the reduction device 200, and the main data may refer to data received from an output tensor of an external main datapath.

The first multiplexer 217 may output one of the output of the ALU 213 and the output result of the adder 215 based on a reset signal. The second multiplexer 219 may output one of the main data and a quantization result of the data based on a phase signal.

The controller 100 (FIG. 1) may control the ALU 213, the first multiplexer 217, and the second multiplexer 219 by generating the operation control signal, the reset signal, and the phase signal. The phase signal may include a first phase signal to prevent a neural network operation apparatus (e.g., the neural network operation apparatus 10 of FIG. 1) from performing an operation, a second phase signal to output the main data and update the internal storage 211, and a third phase signal to output the quantization result.

The phase signal may be a control signal that identifies an operation of the reduction device 200 according to a phase. The reduction device 200 may operate in two or more modes based on the phase signal. Controlling in a compiler level may be beneficial in controlling based on the phase signal.

The phase signal may be a 2-bit signal. In an example, the phase signal may be defined as described below:

A. In the example of a first phase signal=2'b00/2'b11, the neural network operation apparatus 10 is in a "no operation" (NOP) state.

B. In the example of a second phase signal=2'b01, main phase: operate the main datapath and update the reduction device 200.

C. In the example of a third phase signal=2'b10, reduction phase: stop the main datapath and output the reduction device 200.

The controller 100 may initialize the internal storage 211 by data to perform a neural network operation based on the reset signal. The initialization data may be data received from the third register 225.

The controller 100 may initialize the internal storage 211 to be "0" before the performance of a layer that requests the performance of the reduction device 200, without using the reset signal. In this example, an output of the adder 215 may be directly transmitted to the internal storage 211 without using the first multiplexer 217.

The controller 100 may initialize the internal storage 211 by generating the reset signal at a time that a first output of a filter corresponding to the main data is generated. The reset signal may refer to a control signal to initialize a value of the internal storage 211 to be input data. The controller 100 may control the reduction device 200 by generating instructions and a control signal in a form of generating the reset signal when initially loading the filter or when a first output of the filter is generated.

The first register 221 may receive data from the internal storage 211, and store the received data. The second register 223 may receive and store the main data. The third register 225 may store the output of the ALU 213. The fourth register 227 may store the output of the first multiplexer 217.

The quantizer 229 may generate a quantization result by quantizing the data based on a quantization factor. The quantization factor Q may be used to quantize an output value of the reduction device. The quantization factor may be pre-calculated before a neural network operation is performed. The quantizer 229 may quantize an output of an adder tree to perform an addition of outputs of the ALU 213.

The internal storage 211, the first register 221, the second register 223, the third register 225, and the fourth register 227 may be implemented by a memory. The memory may store instructions (or programs) executable by the processor. For example, the instructions may include instructions for executing an operation of the processor and/or instructions for performing an operation of each component of the processor. The processor and the memory may be respectively representative of one or more processors and one or more memories.

The memory may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (M RAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 3A:
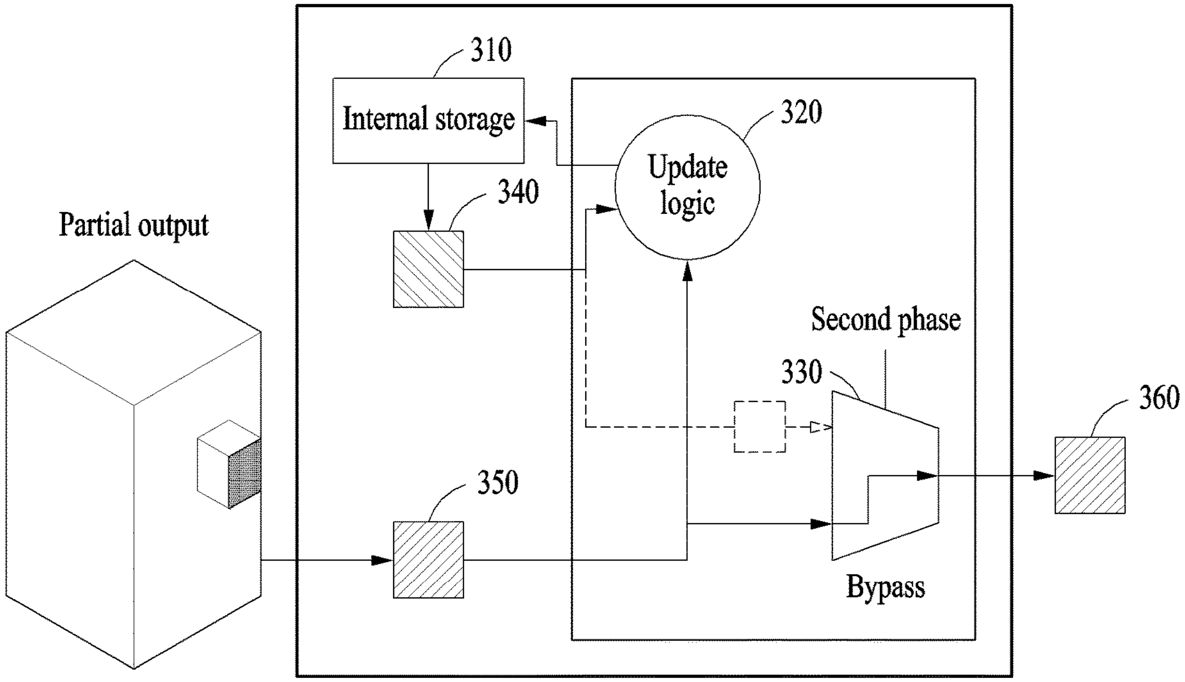
FIGS. 3A and 3B illustrate an example operation of the reduction device of FIG. 2 according to a phase signal, in accordance with one or more embodiments.
Figure 3B:
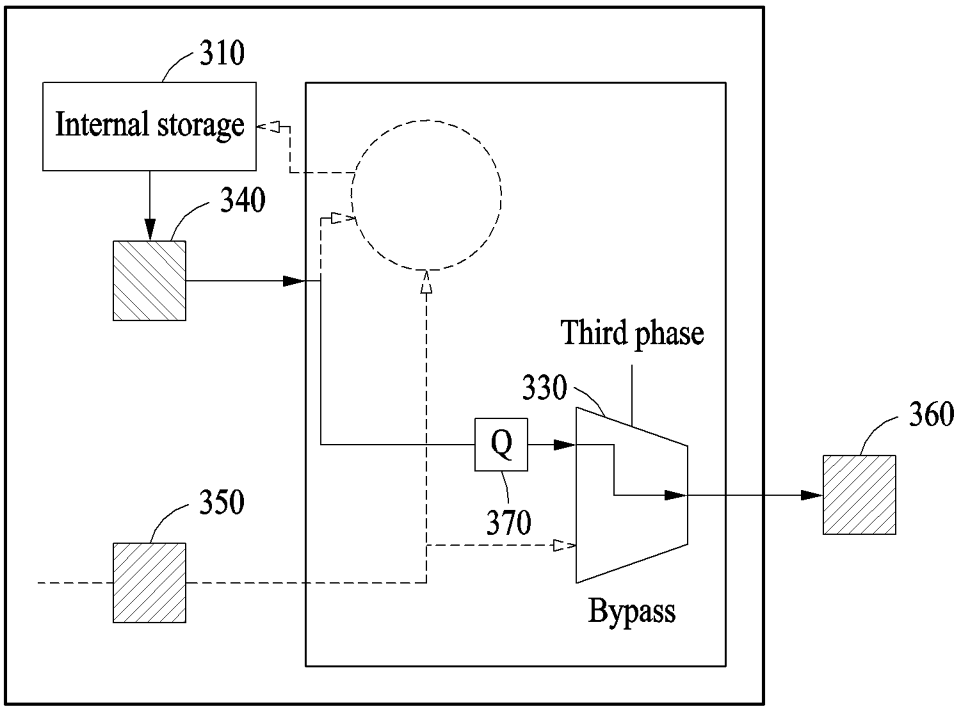

FIGS. 3A and 3B illustrate an example operation of the reduction device of FIG. 2 according to a phase signal, in accordance with one or more embodiments.

Referring to FIGS. 3A and 3B, a controller (e.g., the controller 100 of FIG. 1) may control a reduction module (e.g., the reduction module 200 of FIG. 1) based on a phase signal.

When a reduction operation is to be performed, the controller 100 may operate in a second phase (e.g., an update phase). In the update phase, when a main datapath operates, the controller 100 may update an output tensor of an internal storage 310 and bypass an output of the main datapath and transmit the output to a subsequent operation. In this example, a different update method may be implemented depending on the type of reduction operation.

When a calculation of the main datapath ends, a third phase (e.g., a write phase) may be performed. In the write phase, the controller 100 may output the updated output tensor of the internal storage 310 through a quantizer 370 (e.g., the quantizer 229 of FIG. 2). The quantizer 229 may operate differently depending on the type of reduction operation.

When the type of reduction operation is global pooling, the sum of channel input data may be stored in the internal storage 310 in the update phase. In this example, an ALU (e.g., the ALU 213 of FIG. 2) may perform an addition operation, and the controller 100 may initialize the internal storage 310 using first input data.

In the write phase, the quantizer 370 may preprocess internal data based on a kernel size of global pooling or a predetermined quantization factor and output a preprocessing result.

The controller 100 (FIG. 1) may control an update logic 320 and a second multiplexer 330 (e.g., the second multiplexer 219 of FIG. 2) based on a phase signal. The second phase may refer to a phase to output data based on a main datapath.

The controller 100 may generate a second phase signal, and the second multiplexer 330 may generate, as output data 360, data stored in a second register 350 (e.g., the second register 223 of FIG. 2) that receives main data from the main datapath.

In this example, the controller 100 may update the internal storage 310 (e.g., the internal storage 211 of FIG. 2) using the update logic 320, and the data stored in the internal storage 310 may be stored in a first register 340 (e.g., the first register 221 of FIG. 2).

The third phase may refer to a phase to quantize and output the data stored in the internal storage 310. The second multiplexer 330 may output output data 360 based on a third phase signal. The second multiplexer 330 may output a quantization result based on the third phase signal.

The first register 340 may receive data from the internal storage 310 and store the data. The first register 340 may output the data to the quantizer 370 (e.g., the quantizer 229 of FIG. 2).

The quantizer 370 may generate a quantization result of the data based on a quantization factor.

Figure 4:
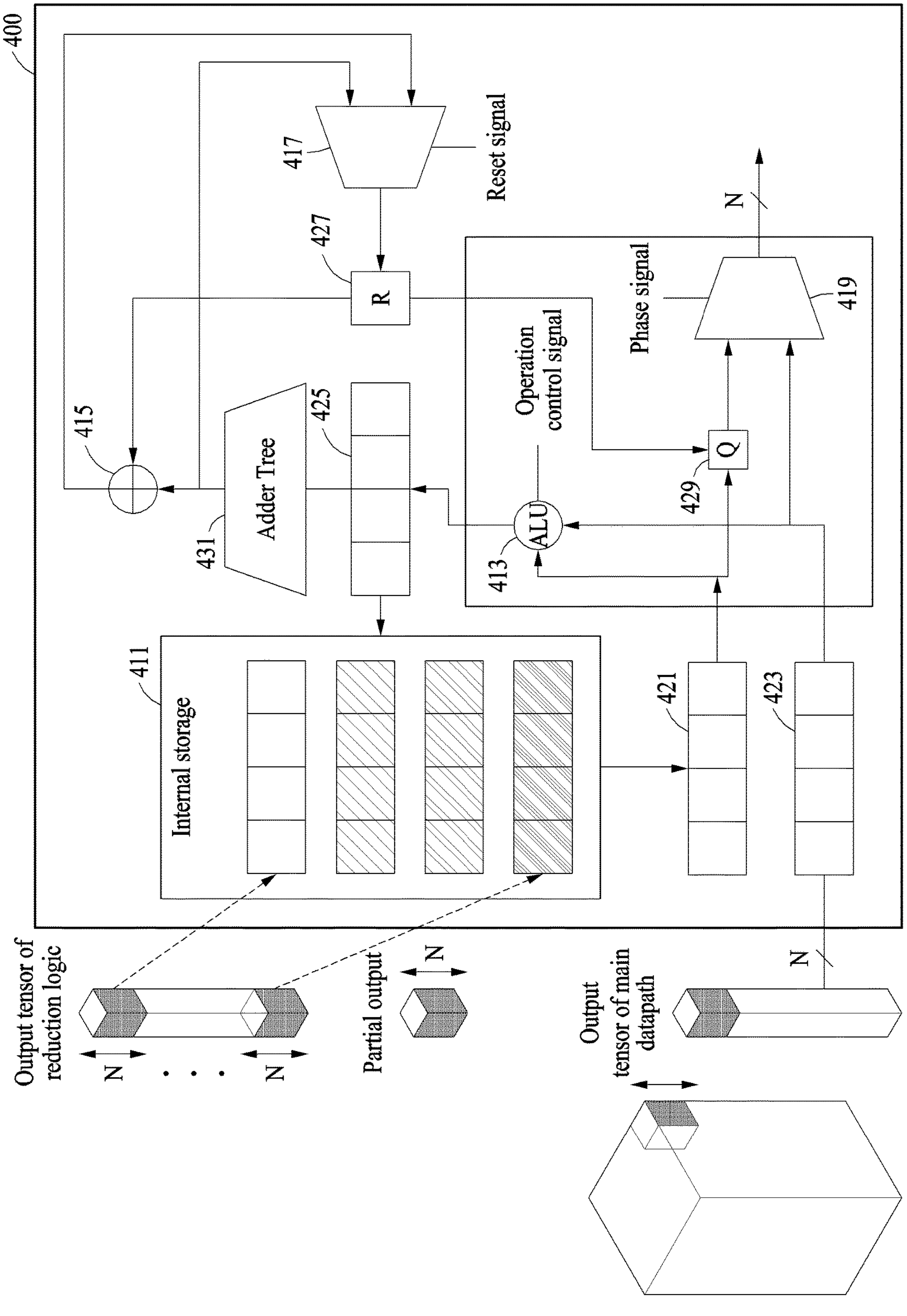
FIG. 4 illustrates an example reduction device shown in FIG. 1.

FIG. 4 illustrates an example reduction device illustrated in FIG. 1.

Referring to FIG. 4, a reduction device 400 (e.g., the reduction device 200 of FIG. 1) may perform a reduction operation. The reduction device 400 may include an internal storage 411, an ALU 413, an adder 415, a first multiplexer 417, and a second multiplexer 419. The reduction device 400 may further include a first register 421, a second register 423, a third register 425, a fourth register 427, a quantizer 429, and an adder tree 431.

The internal storage 411 may operate in the same manner as the internal storage 211 of FIG. 2.

The ALU 413 may perform an operation between the stored data and main data based on an operation control signal. The ALU 413 may perform an addition operation or an exponential operation between the stored data and the main data based on the operation control signal. The ALU 413 may generate an exponential operation result by performing the exponential operation.

The adder tree 431 may perform an addition of outputs of the ALU 413.

The adder 415 may add an output of the adder tree 431 and an output of the first multiplexer 417.

The first register 421 may operate in the same manner as the first register 221 of FIG. 2. The second register 423 may operate in the same manner as the second register 223 of FIG. 2. The third register 425 may operate in the same manner as the third register 225 of FIG. 2. The fourth register 427 may operate in the same manner as the fourth register 227 of FIG. 2.

The quantizer 429 may quantize the output of the adder tree 431. The adder tree 431 may perform a softmax operation by adding exponential operation results output from the ALU 413.

The reduction device 400 may be applied to an operation device (e.g., an NPU) having a channel direction input/output form. The reduction device 400 may be applied to an adder tree-based operation device.

Since channel direction outputs generated in a main datapath of the operation device may be input to the reduction device 400, and each input may be independently involved in an output tensor, it may be extended to an elementwise-based component. The adder tree 431 may be added to perform a softmax operation.

Figure 5A:
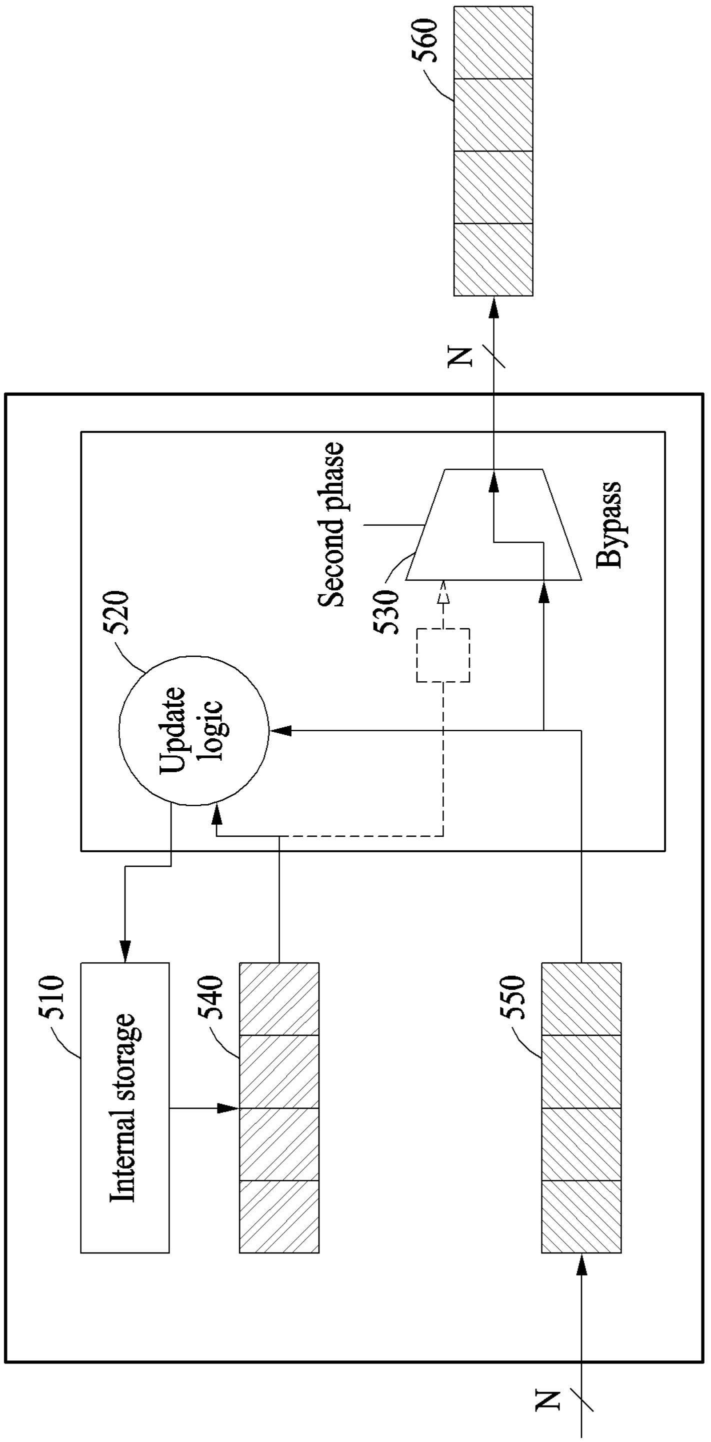
FIGS. 5A and 5B illustrate an example operation of the reduction device of FIG. 4 according to a phase signal, in accordance with one or more embodiments.
Figure 5B:
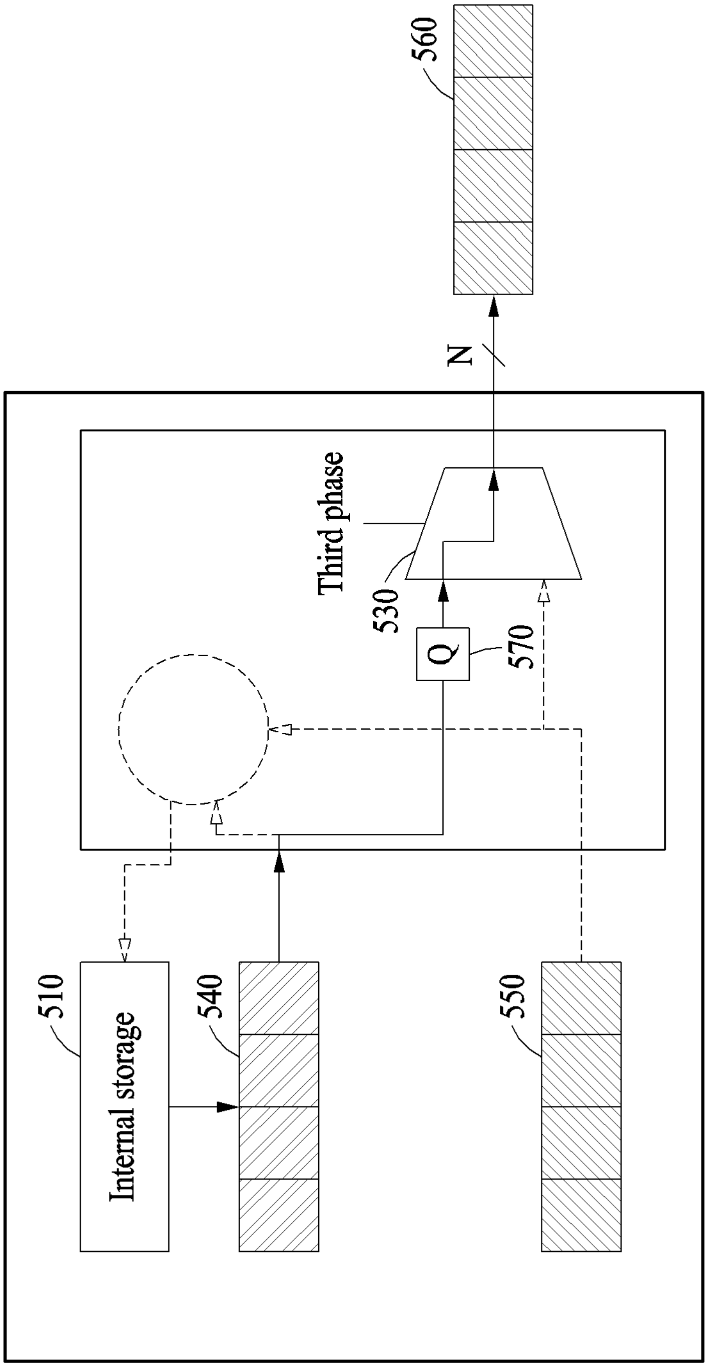

FIGS. 5A and 5B illustrate an example operation of the reduction device of FIG. 4 according to a phase signal, in accordance with one or more embodiments.

Referring to FIGS. 5A and 5B, a controller (e.g., the controller 100 of FIG. 1) may control a reduction device (e.g., the reduction device 400 of FIG. 4) based on a phase signal.

The controller 100 may control an update logic 520 and a second multiplexer 530 (e.g., the second multiplexer 219 of FIG. 2) based on the phase signal. A second phase (e.g., an update phase) may refer to a phase to output data based on a main datapath.

When the type of reduction operation is a softmax operation, the controller 100 may bypass an input to output in the update phase. In this example, the ALU 213 may perform an exponential operation (e.g., exp(x)) and store results of the exponential operation in the internal storage 310.

The controller 100 may update and store the sum of the results of the exponential operation in a fourth register (e.g., the fourth register 427 of FIG. 4) using an adder tree (e.g., the adder tree 431 of FIG. 4). In a third phase (e.g., a write phase), the controller 100 may preprocess and output data stored in the internal storage 510 by a quantizer 570 (e.g., the quantizer 429 of FIG. 4) according to the values stored in the fourth register 427.

The controller 100 may generate a second phase signal, and the second multiplexer 530 may generate, as output data 560, data stored in a second register 550 (e.g., the second register 223 of FIG. 2) that receives main data from the main datapath.

In this example, the controller 100 may update the internal storage 510 (e.g., the internal storage 211 of FIG. 2) using the update logic 520, and the data stored in the internal storage 510 may be stored in a first register 540 (e.g., the first register 221 of FIG. 2).

The third phase may refer to a phase to quantize and output the data stored in the internal storage 510. The second multiplexer 530 may output output data 560 based on a third phase signal. The second multiplexer 530 may output a quantization result based on the third phase signal.

The first register 540 may receive data from the internal storage 510 and store the received data. The first register 540 may output the data to the quantizer 570 (e.g., the quantizer 229 of FIG. 2).

The quantizer 570 may generate a quantization result of the data based on a quantization factor.

Figure 6:
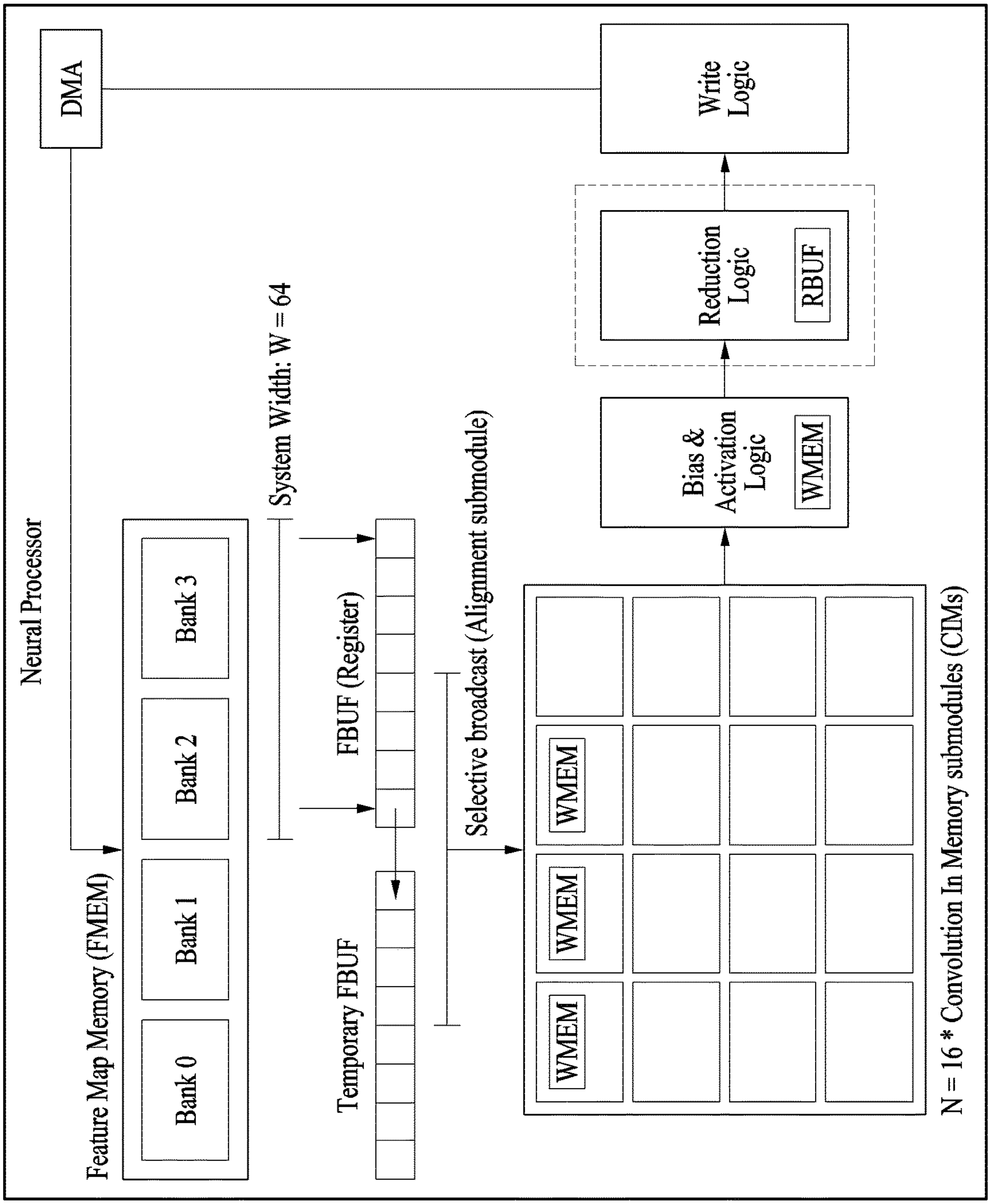
FIG. 6 illustrates an example implementation of the neural network operation apparatus of FIG. 1.

FIG. 6 illustrates an example implementation of the example neural network operation apparatus of FIG. 1.

Referring to FIG. 6, a reduction device (e.g., the reduction device 200 of FIG. 1) may be applied to an adder tree-based operation device (e.g., an NPU). In the example of applying the reduction device 200 to an NPU, a control signal to control the reduction device may be beneficial.

Figure 7:
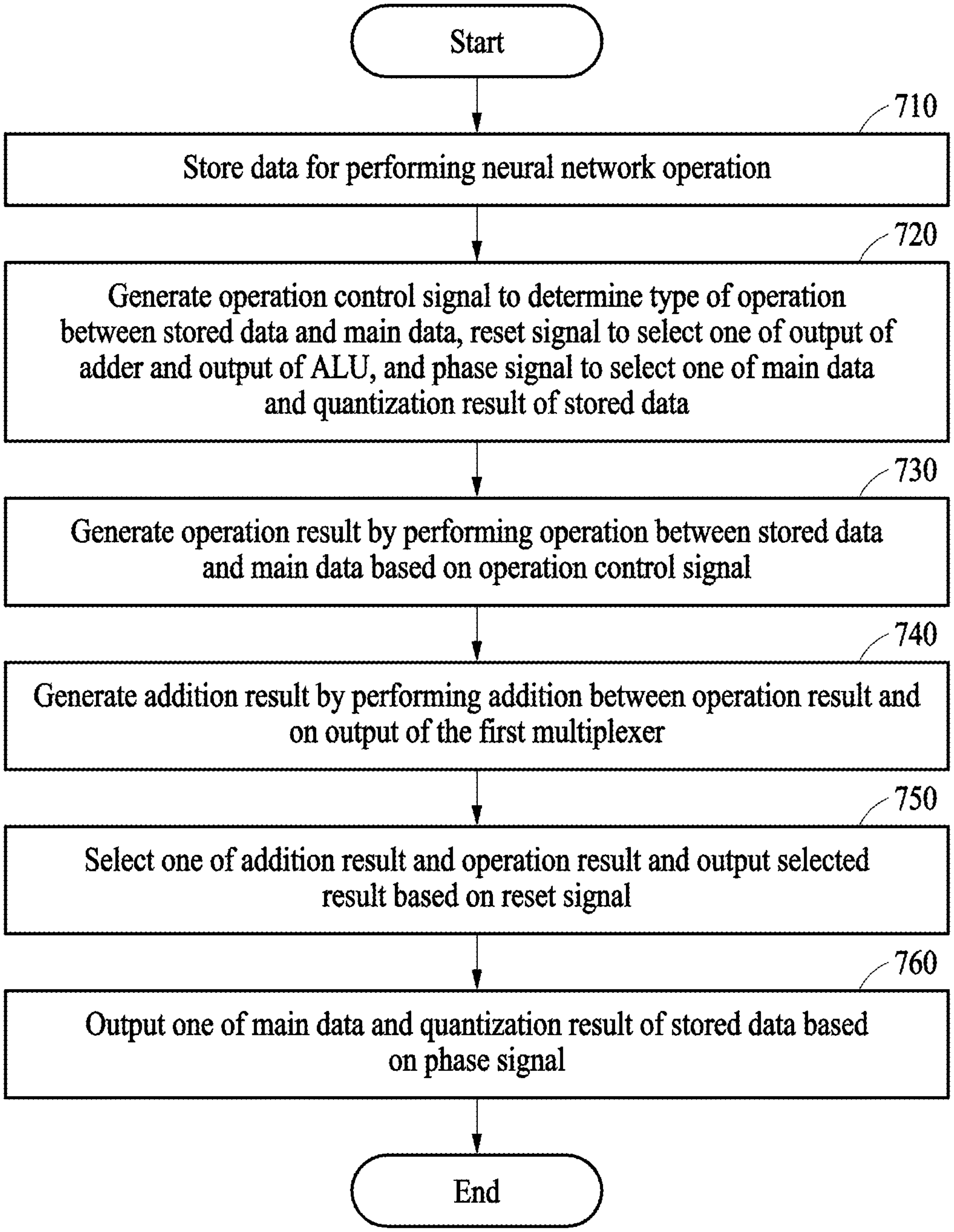
FIG. 7 illustrates an example operation of the neural network operation apparatus of FIG. 1.

FIG. 7 illustrates an example operation of the example neural network operation apparatus of FIG. 1, in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, an internal storage (e.g., the internal storage 211 of FIG. 2) may store data to perform a neural network operation. The internal storage 211 may store the data based on a channel index indicating a position of an output tensor of the data.

In operation 720, a controller (e.g., the controller 100 of FIG. 1) may generate an operation control signal to determine a type of operation between the stored data and main data, a reset signal to select one of an output of an adder and an output of an ALU, and a phase signal to select one of the main data and a quantization result of the stored data.

The phase signal may include a first phase signal to prevent a neural network operation from being performed, a second phase signal to output the main data and update an internal storage configured to store the data, and a third phase signal to output the quantization result.

In operation 730, the ALU (e.g., the ALU 213 of FIG. 2) may generate an operation result by performing an operation between the stored data and the main data based on the operation control signal. The ALU 213 may perform an addition operation or an exponential operation between the stored data and main data based on the operation control signal. The ALU 213 may generate exponential operation results by performing the exponential operation.

An adder tree (e.g., the adder tree 431 of FIG. 4) may perform an addition of outputs of the ALU 213. The adder tree 431 may perform a softmax operation by adding exponential operation results.

In operation 740, an adder (e.g., the adder 215 of FIG. 2) may generate an addition result by performing an addition between the operation result generated through the ALU 213 and an output of the first multiplexer 217.

In operation 750, a first multiplexer (e.g., the first multiplexer 217 of FIG. 2) may select one of the addition result and the operation result, and output the selected result based on the reset signal.

In operation 760, a second multiplexer (e.g., the second multiplexer 219 of FIG. 2) may output one of the main data and the quantization result of the stored data based on the phase signal. A quantizer (e.g., the quantizer 229 of FIG. 2) may generate the quantization result by quantizing the stored data based on a quantization factor. The quantizer 229 may quantize an output of the adder tree 431 to perform an addition of outputs of the ALU 213.

A first register (e.g., the first register 221 of FIG. 2) may receive data from the internal storage 211 in which the data is stored and store the received data. A second register (e.g., the second register 223 of FIG. 2) may receive and store the main data. A third register (e.g., the third register 225 of FIG. 2) may store the output of the ALU 213. A fourth register (e.g., the fourth register 227 of FIG. 2) may store a result selected from the addition result and the operation result.

A neural network apparatus of one or more embodiments may be configured to reduce the amount of calculations to process a neural network, thereby solving such a technological problem and providing a technological improvement by advantageously increasing a calculation speed of the neural network apparatus of one or more embodiments over the typical neural network apparatus.

The neural network operation apparatus 10, controller 100, reduction device 200, and other apparatuses, units, modules, devices, and other components described herein and with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-8 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network operation apparatus, comprising:

an internal storage configured to store first data to perform a neural network operation;

an arithmetic logical unit (ALU) configured to, based on an operation control signal, perform an operation between the first data and main data that is received;

an adder configured to add an output of the ALU and an output of a first multiplexer, wherein the first multiplexer is configured to output one of an output of the adder and the output of the ALU based on a reset signal;

a second multiplexer configured to output one of the main data and a quantization result of the first data based on a phase signal; and a controller configured to control the ALU, the first multiplexer, and the second multiplexer based on the operation control signal, the reset signal, and the phase signal, respectively.

2. The apparatus of claim 1, further comprising:

a first register configured to receive the first data from the internal storage and store the received first data;

a second register configured to receive and store the main data;

a third register configured to store the output of the ALU; and a fourth register configured to store the output of the first multiplexer.

3. The apparatus of claim 1, further comprising:
a quantizer configured to generate the quantization result by quantizing the first data based on a quantization factor.

4. The apparatus of claim 1, wherein the internal storage is further configured to store the first data based on a channel index that indicates a position of an output tensor of the first data.

5. The apparatus of claim 1, wherein the ALU is further configured to perform one of an addition operation and an exponential operation on the stored first data and the main data based on the operation control signal.

6. The apparatus of claim 1, wherein the phase signal comprises:
a first phase signal to prevent the neural network operation apparatus from performing an operation;
a second phase signal to output the main data and update the internal storage; and
a third phase signal to output the quantization result.

7. The apparatus of claim 1, further comprising:
an adder tree configured to perform an addition of the output a plurality of outputs of the ALU.

8. The apparatus of claim 7, wherein
the ALU is further configured to generate an exponential operation result by performing an exponential operation, and
the adder tree is further configured to perform a softmax operation by adding a plurality of exponential operation results.

9. The apparatus of claim 3, wherein the quantizer is further configured to quantize an output of an adder tree which is configured to perform an addition of a plurality of outputs of the ALU.

10. A processor-implemented neural network operation method, the method comprising:
storing first data to perform a neural network operation;
generating an operation control signal to determine a type of operation between the first data and main data that is received, a reset signal to select one of an output of an adder and an output of an arithmetic logical unit (ALU), and a phase signal to select one of the main data and a quantization result of the first data;
generating an operation result by performing an operation between the stored first data and the main data based on the operation control signal;
generating an addition result by performing an addition between the operation result and a result selected from a result of the output of the adder and a result of the output of the ALU;
selecting one of the operation result and a result of the addition, and outputting the selected one based on the reset signal; and
outputting one of the main data and the quantization result of the stored data based on the phase signal.

11. The method of claim 10, further comprising:
receiving the first data from an internal storage and storing the received first data;
receiving and storing the main data;
storing the output of the ALU; and
storing a result selected from the result of the addition and the operation result.

12. The method of claim 10, wherein the outputting of one of the main data and the quantization result of the first data based on the phase signal comprises generating the quantization result by quantizing the first data based on a quantization factor.

13. The method of claim 10, wherein the storing of the first data comprises storing the first data based on a channel index that indicates a position of an output tensor of the first data.

14. The method of claim 10, wherein the generating of the operation result comprises performing one of an addition operation and an exponential operation on the first data and the main data based on the operation control signal.

15. The method of claim 10, wherein the phase signal comprises:
a first phase signal to prevent a neural network operation from being performed;
a second phase signal to output the main data and update an internal storage configured to store the first data; and
a third phase signal to output the quantization result.

16. The method of claim 10, further comprising:
performing an addition of a plurality of outputs of the ALU.

17. The method of claim 16, wherein
the generating of the operation result comprises generating an exponential operation result by performing an exponential operation, and
the performing of the addition of the plurality of the outputs of the ALU comprises performing a softmax operation by adding a plurality of exponential operation results.

18. The method of claim 12, wherein the generating of the quantization result comprises quantizing an output of an adder tree configured to perform an addition of a plurality of outputs of the ALU.

19. A non-transitory computer-readable storage medium storing instructions that, when executed by a processor, cause the processor to perform the neural network operation method of claim 10.

* * * * *